(12) United States Patent
Erol

(10) Patent No.: US 8,116,582 B2
(45) Date of Patent: *Feb. 14, 2012

(54) TECHNIQUES FOR POSITIONING IMAGES IN ELECTRONIC DOCUMENTS

(75) Inventor: Berna Erol, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 765 days.

This patent is subject to a terminal disclaimer.

(21) Appl. No.: 12/286,375

(22) Filed: Sep. 29, 2008

(65) Prior Publication Data

US 2009/0028382 A1    Jan. 29, 2009

Related U.S. Application Data

(63) Continuation of application No. 10/954,130, filed on Sep. 28, 2004, now Pat. No. 7,454,086.

(51) Int. Cl.
*G06K 9/40* (2006.01)

(52) U.S. Cl. ........ 382/254; 382/276; 382/282; 382/283; 382/226; 382/162; 399/182; 399/183; 399/184; 399/366

(58) Field of Classification Search .................. 382/254, 382/276, 282, 283, 226, 162; 399/182, 183, 399/184, 366
See application file for complete search history.

(56) References Cited

U.S. PATENT DOCUMENTS

| 3,637,993 | A | 1/1972 | Christie et al. |
| 5,616,402 | A | 4/1997 | Roth et al. |
| 5,682,540 | A | 10/1997 | Klotz, Jr. et al. |
| 5,781,914 | A | 7/1998 | Stork et al. |
| 5,901,245 | A | 5/1999 | Warnick et al. |
| 5,933,829 | A | 8/1999 | Durst et al. |
| 5,978,773 | A | 11/1999 | Hudetz et al. |
| 6,108,656 | A | 8/2000 | Durst et al. |
| 6,199,048 | B1 | 3/2001 | Hudetz et al. |
| 6,354,502 | B1 | 3/2002 | Hagstrom et al. |
| 6,430,554 | B1 | 8/2002 | Rothschild |
| 6,434,561 | B1 | 8/2002 | Durst, Jr. et al. |
| 6,442,606 | B1 | 8/2002 | Subbaroyan et al. |

(Continued)

FOREIGN PATENT DOCUMENTS

EP          670 555 A1     9/1995

(Continued)

OTHER PUBLICATIONS

Campadelli et al., "A System for the Automatic Selection of Conspicuous Color Sets for Qualitative Data Display," *IEEE Trans. Geosci. Remote Sensing*, 39(10):2283-2286 (2001).

(Continued)

*Primary Examiner* — Mike Rahmjoo
(74) *Attorney, Agent, or Firm* — Kilpatrick Townsend & Stockton LLP

(57) ABSTRACT

Techniques for positioning images in an electronic document. The images may encode information that can be decoded by devices configured to read the images. An area within the electronic document for positioning the image and a set of one or more colors to be used for the image are determined. The determined area and set of colors are such that the image when positioned in the electronic document blends in with the contents of the electronic document while still being clearly visible for reading by reader devices that are configured read and decode the information encoded by the image.

16 Claims, 8 Drawing Sheets
(3 of 8 Drawing Sheet(s) Filed in Color)

U.S. PATENT DOCUMENTS

| | | | |
|---|---|---|---|
| 6,535,706 B1 * | 3/2003 | Konno | 399/182 |
| 6,542,933 B1 | 4/2003 | Durst, Jr. et al. | |
| 6,587,859 B2 | 7/2003 | Dougherty et al. | |
| 6,651,053 B1 | 11/2003 | Rothschild | |
| 6,675,165 B1 | 1/2004 | Rothschild | |
| 6,711,291 B1 | 3/2004 | Stubler et al. | |
| 6,766,363 B1 | 7/2004 | Rothschild | |
| 6,804,379 B2 | 10/2004 | Rhoads | |
| 6,865,608 B2 | 3/2005 | Hunter | |
| 6,912,069 B1 | 6/2005 | Matsunoshita | |
| 6,993,573 B2 | 1/2006 | Hunter | |
| 7,149,957 B2 | 12/2006 | Hull et al. | |
| 7,263,659 B2 | 8/2007 | Hull et al. | |
| 7,454,086 B2 | 11/2008 | Erol | |
| 2002/0076081 A1 | 6/2002 | Rhoads | |

FOREIGN PATENT DOCUMENTS

| | | |
|---|---|---|
| EP | 1 085 464 A2 | 3/2001 |
| EP | 1 643 410 A2 | 4/2006 |
| JP | 2000-259758 A | 9/2000 |
| JP | 2000-285192 A | 10/2000 |
| JP | 2006-99767 A | 4/2006 |
| WO | WO 98/45799 A1 | 10/1998 |

OTHER PUBLICATIONS

Doerschler et al., "A rule-based system for dense-map name placement," *Communications of the ACM*, 35(1):68-79 (1992).

Gill et al., "Canvas: An Intelligent Colour Selection Tool for VDU Images," *Proc. IGARSS '88 Symposium*, pp. 1785-1787 (1988).

Moroshnikov et al., "A Framework for Name Placement Problem Solving in GIS," *Proc. of CSIT '99*, pp. 187-190, held in Moscow, Russia (1999).

European Search Report of Feb. 27, 2006 in published European Patent 1643410, application No. 05-020-670.5-1527.

Communication Pursuant to Article 96(2) EPC dated Apr. 12, 2007 received in corresponding European Application No. 05-020-670.5-1527 (6 pages).

"Barcodes: Color & Contrast," printed from http://www.barcodeman.com/info/color_bc.php on Jun. 16, 2006 (3 pages).

Web pages from PaperClip.com printed from http://www.paperclip.com on Jun. 14, 2006 (10 pages).

Office Action in the counterpart Japanese Application No. 2005-278631 dated Sep. 13, 2011, 2 pages.

* cited by examiner

TECHNIQUES FOR POSITIONING IMAGES IN ELECTRONIC DOCUMENTS

CROSS-REFERENCES TO RELATED APPLICATIONS

The present application claims priority from and is a continuation of U.S. Non-Provisional application Ser. No. 10/954,130, filed Sep. 28, 2004, entitled "TECHNIQUES FOR POSITIONING IMAGES IN ELECTRONIC DOCUMENTS", which issued as U.S. Pat. No. 7,454,086 on Nov. 18, 2008, the entire contents of which are incorporated herein by reference for all purposes.

The present invention herein incorporates by reference for all purposes the entire contents of:

(1) U.S. application Ser. No. 10/001,895 filed Nov. 19, 2001 which issued as U.S. Pat. No. 7,263,659; and (2) U.S. application Ser. No. 10/001,894 filed Nov. 19, 2001 which issued as U.S. Pat. No. 7,149,957.

BACKGROUND OF THE INVENTION

The present invention relates to placement of images, and more particularly to techniques for determining one or more colors for an image and an area within an electronic document for positioning the image such that the image blends in with the contents of the electronic document.

The use of printed images that encode information has seen widespread use in recent times. Examples of such images include barcodes, and the like. These images are designed to be read by readers that use electro-optical means to scan or read the images and decode the information encoded by the images. Images such as barcodes are used for various applications. For example, barcodes (representing Universal Product Codes or UPCs) are commonly printed on product labels. A barcode reader may be used to scan and decode the information encoded by the scanned barcode. The decoded information may identify the product or some characteristic of the product. The decoded information may then be communicated to a data processing system for further processing such as determining the price of the product, determining availability of the product, etc. As another example, barcodes are commonly used for linking the physical world to the electronic world. For example, barcodes may be printed on a paper document and scanning a barcodes enables a user to access electronic information. For example, the scanned barcode may enable the user to access a web page corresponding to the scanned barcode, an electronic version of the contents printed on the paper document, multimedia information, etc. The barcode printed on the paper document thus acts as a hot link to the electronic data.

There is considerable amount of work being done in the area of designing barcodes and reading devices that are configured to read and decoded information encoded by the barcodes. There are various types of barcodes including barcodes comprising a series of bars of various widths separated by spaces of various widths (e.g., ITF14, UPC-E), or comprising arrays of dots and rectangles (e.g., PDF417, QRcodes), and the like. Traditionally, most barcodes are designed to be in black and white to facilitate reading by the barcode readers (e.g., black stripes are printed on a white background or separated by white spaces). The white background reflects more light than the black foreground and this property is used by readers to read and decode the barcodes.

The use of colored barcodes is also becoming increasingly popular. In fact, various barcode technologies are being developed specifically for colored barcodes. For example, two-dimensional barcodes are being designed with a plurality of colored glyphs. Barcodes are also being designed with a continuous color tone background and a barcode pattern that is not identifiable with the naked eye but only by an infrared detector reader. Other barcodes are being designed that comprise color bars and the color change between adjacent color bars encodes the information. Color is also being used to increase the amount of information encoded by a barcode. Reading devices are also available that can read colored barcodes. For example, scanners are available that can read and decode barcodes whose background is a light color (e.g., a color towards the red end of the light spectrum) and whose foreground is a dark color (e.g., a color towards the blue end of the light spectrum).

Due to the manner in which images such as barcodes are used, they have to printed such that they are clearly visible for scanning. This however often causes the barcodes to be printed in a visually distracting manner that reduces the aesthetic value of the material on which they are printed. Accordingly, techniques for printing the barcodes in a manner that renders them less visually distractive but still clearly visible are desired.

BRIEF SUMMARY OF THE INVENTION

Embodiments of the present invention provide techniques for positioning images in an electronic document. The images may encode information that can be decoded by devices configured to read the images. An area within the electronic document for positioning the image and a set of one or more colors to be used for the image are determined. The determined area and set of colors are such that the image when positioned in the electronic document blends in with the contents of the electronic document while still being clearly visible for reading by reader devices that are configured read and decode the information encoded by the image.

According to an embodiment of the present invention, techniques are provided for positioning an image in an electronic document. An electronic document and a first image to be positioned in the electronic document are received. The first image may encode information. Information identifying a plurality of colors is received. A first area within the electronic document is determined for positioning the first image. Based upon the first area, a set of one or more colors from the plurality of colors is determined for the first image.

The foregoing, together with other features, embodiments, and advantages of the present invention, will become more apparent when referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION OF THE INVENTION

Embodiments of the present invention provide techniques for positioning images in an electronic document. The images may encode information that can be decoded by devices configured to read the images. Examples of such images include barcodes of various types (e.g., vertical stripes barcodes, multidimensional barcodes, etc.), QRCodes, image of text in optical character recognizable (OCRable) fonts, and other like images that can encode information. An area within the electronic document for spatially positioning the image and a set of one or more colors to be used for the image are determined. The area within the electronic document for positioning the barcode and the set of colors are determined based upon attributes or features of the electronic document in which the image is to be placed. The determined area and set of colors are such that the image when positioned in the electronic document blends in with the contents of the electronic document while still being clearly visible for reading by reader devices that are configured read and decode the information encoded by the image. Examples of electronic documents in which the image may be placed include editable documents (e.g., MS Word document), text documents, Tag Image File Format (TIFF) files, Portable Document Format (PDF) documents, Flash documents, Hypertext Markup Language (HTML) documents, and the like.

In the following description, for purposes of explanation and in order to provide a thorough understanding of the invention, a specific embodiment of the invention is described for placing barcodes within an electronic document. However, the scope of the present invention is not limited to barcodes. The teachings of the present invention may be applied to any image that is to be placed in an electronic document. The image may encode information that can be read and decoded by a reader device. Reader devices may include scanners of various types (e.g., laser scanners), cameras (both digital and film-based), video cameras, infrared cameras, and the like. Further, specific details are set forth in order to provide a thorough understanding of the invention. However, it will be apparent that the invention may be practiced without these specific details.

Figure 1:
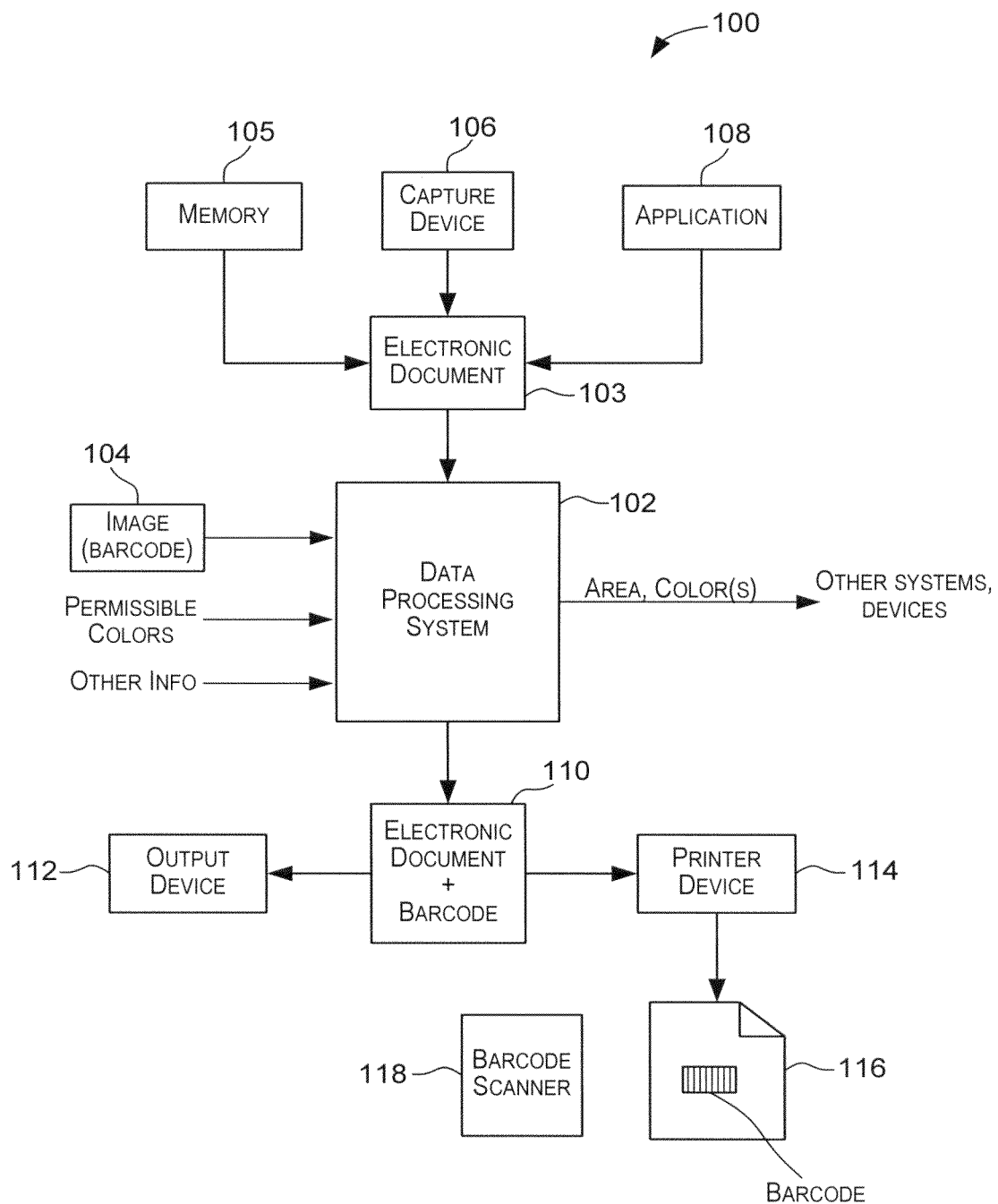
FIG. 1 is a simplified block diagram of a system that may incorporate an embodiment of the present invention.

FIG. 1 is a simplified block diagram of a system 100 that may incorporate an embodiment of the present invention. System 100 depicted in FIG. 1 is merely illustrative of an embodiment incorporating the present invention and does not limit the scope of the invention as recited in the claims. One of ordinary skill in the art would recognize other variations, modifications, and alternatives.

As shown in FIG. 1, a computer or data processing system 102 is configured to perform processing according to the teachings of the present invention. Data processing system 102 is configured to determine a spatial area (or multiple areas) within an electronic document 103 for positioning a barcode 104. Data processing system 102 is also configured to determine a set of one or more colors to be used for the barcode.

Data processing system 102 may access the electronic document 103 from a memory 105 location accessible to data processing system 102. Data processing system may also receive an electronic document 103 from a capture device 106 such as a scanner, a copier, a camera, etc. For example, a scanner may be used to scan a paper document and generate an electronic representation of the paper document. Data processing system 102 may receive the electronic representation as the electronic document. As another example, a camera may be used to capture an image that represents the electronic document received by data processing system 102. The electronic document may also be generated by applications 108 such as word processing applications (e.g., MS Word, MS Excel, Adobe Acrobat), image processing applications (e.g., Adobe Photoshop), and other applications that are capable of generating electronic documents. Electronic document 103 may also be received from other sources.

Barcode 104 to be placed in electronic document 103 may be provided to data processing system 102. Alternatively, data processing system 102 may be configured to generate the barcode.

According to an embodiment of the present invention, data processing system 102 is configured to select the one or more colors to be used for the barcode from a set of colors that are permitted for the barcode. Information identifying the permissible set of colors may be provided to data processing system 102 as shown in FIG. 1. Alternatively, data processing system 102 may be configured to automatically determine a set of permissible colors based upon criteria such as the type of barcode, the target reader device to be used for scanning the barcode, and the like.

Data processing system 102 is configured to determine an area within the electronic document for positioning the barcode and one or more colors from the permissible colors to be used for the barcode based upon features of the electronic document in which the barcode is to be positioned. These features may include the contents (including text and images) of the electronic document, the colors used in the electronic document, the distribution of the contents within the electronic document, a specific portion of the electronic document where the barcode is to be placed or associated with, and other features of the electronic document. Data processing system 102 may be configured to analyze the electronic document to extract features of the electronic document. Data processing system 102 may then use one or more of the features to determine the spatial area for positioning the barcode within the electronic document and the one or more colors from the permissible colors to be used for the barcode.

Data processing system 102 may also use other criteria that may be used to determine the spatial area within the electronic document for positioning the barcode and colors of the barcode. For example, the size of the barcode to be positioned in the electronic document may be provided to data processing system 102 and may influence the determination of the area within the electronic document for placing the barcode. Other criteria may also include properties of a printer that is to be used for printing the electronic document with the barcode, the print resolution, the quality of the paper to be used for printing, and other like criteria. The other criteria information may be provided to data processing system 102, as shown in FIG. 1. Data processing system 102 may also be configured to automatically determine the other criteria information or portions thereof.

Data processing system 102 may be configured to communicate information identifying the spatial area within the electronic document for positioning the barcode and information identifying the one or more colors to be used for printing the barcode to another device or system for further processing or to the user. In other embodiment, in addition to determining the area within the electronic document for positioning the barcode and the one or more colors for the barcode, data processing system 102 may also be configured to generate an electronic document comprising the original electronic document and barcode, wherein the barcode is generated using the one or more colors determined by data processing system 102 and spatially positioned in the area determined by data processing system 102.

The document 110 comprising the original electronic document and the barcode may be output to a user via an output device 112 coupled to data processing system 102. Document 110 may also be communicated to a printer device 114 that may print the electronic document on a paper medium to generate paper document 116. The printed paper document 116 is a printed version of the electronic document with the barcode printed in a position determined by data processing system 102. The barcode is printed using the one or more colors determined by data processing system 102. Examples of paper documents 116 include photos, greeting cards, advertisements, magazine pages, labels, articles, etc.

Paper document 116 which has the barcode printed on it may be used for a variety of different applications. According to an embodiment of the present invention, the barcode printed on paper document 116 may enable a user to access electronic data. A user may scan the barcode using a barcode reader 118 that is capable of scanning colored barcodes and decoding the information encoded by the barcode. The decoded information may then be used to access electronic data. Accordingly, in this embodiment, the printed barcode links the physical world of the paper document with the electronic world. The electronic data may be a URL, multimedia information, an electronic representation of the paper document, pricing information, inventory information, and other various types of electronic information the like. According to an embodiment of the present invention, scanning the barcode may invoke an application (e.g., a multimedia player) on a computer system that outputs or plays back the electronic data.

Various applications of the paper document with a barcode printed on it according to the teachings of the present invention are possible. For example, the paper document may comprise a news summary and scanning the barcode printed on the paper document may invoke a news clip on an output device. The paper document may be a greeting card with a barcode printed on it and scanning the barcode may invoke an audible greeting (e.g., the "happy birthday" song). The paper document may be a magazine page comprising an article or advertisement with a barcode printed on it and scanning the barcode may initiate playback of a video clip related to the article or of the advertisement. Other applications include pages for photo albums, video albums, newspaper and magazine articles, presentation materials and slides, product catalogs, motion printing, product boxes, HTML, Flash, MPEG-4 printing, documents representing multimedia information, etc.

U.S. application Ser. Nos. 10/001,895 and 10/001,894 (both filed Nov. 19, 2001 and both assigned to the same assignee as the present application) describe techniques for producing paper documents that represent multimedia information. The corresponding multimedia information can be accessed using user-selectable identifiers such as barcodes printed on the paper document. The teachings of the present invention may be used to enhance the printing of the paper documents such that the user-selectable identifiers when printed on the paper document aesthetically blend in with the other contents of the paper document. The entire contents of U.S. application Ser. Nos. 10/001,895 and 10/001,894 are incorporated herein by reference for all purposes, etc.

Figure 2:
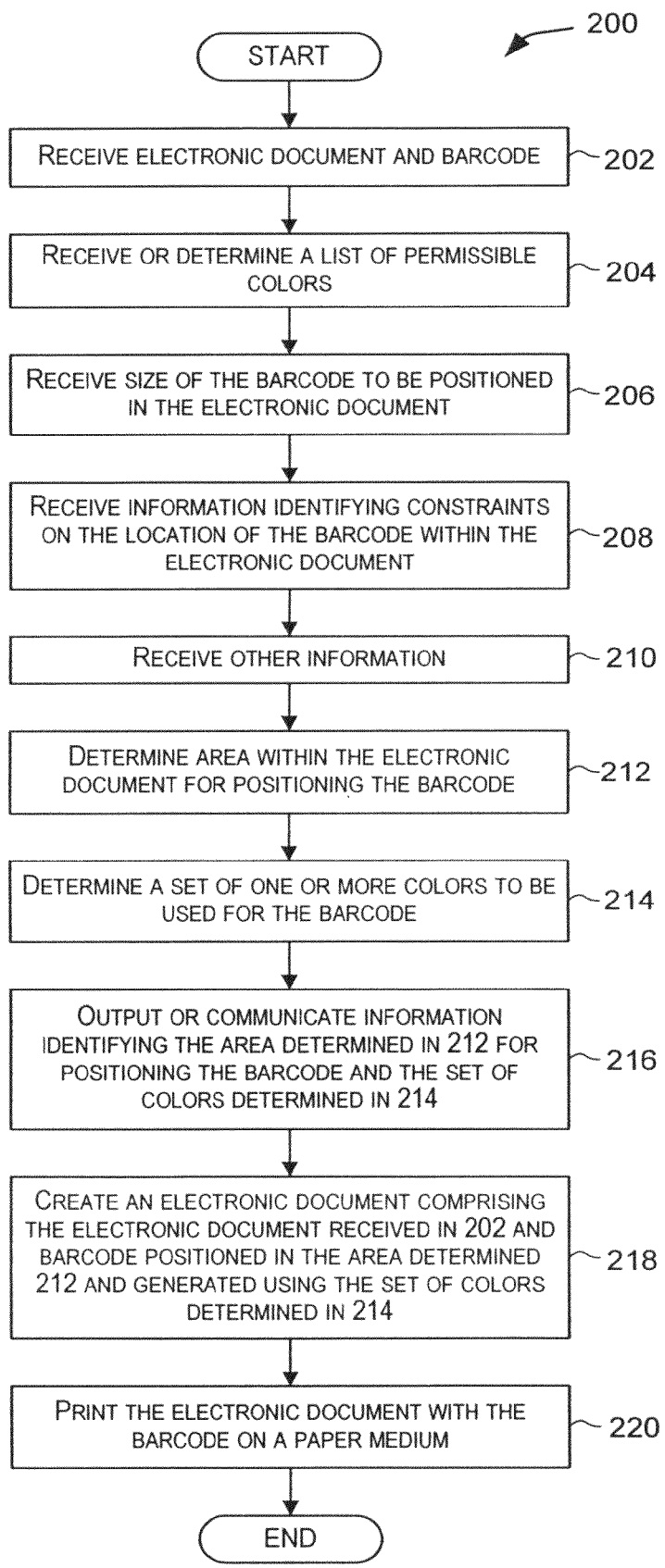
FIG. 2 is a simplified high-level flowchart depicting a method of determining an area within an electronic document for positioning a barcode and for determining one or more colors for the barcode according to an embodiment of the present invention.

FIG. 2 is a simplified high-level flowchart 200 depicting a method of determining an area within an electronic document for positioning a barcode and for determining one or more colors for the barcode according to an embodiment of the present invention. The method depicted in FIG. 2 may be performed by software (code modules or instructions) executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention. The method depicted in FIG. 2 may be adapted to work with different implementation constraints.

As depicted in FIG. 2, processing is initiated when data processing system 102 receives an electronic document and a barcode (any image in general) to be positioned in the electronic document (step 202). Data processing system 102 may access the electronic document from a memory location or may receive the electronic document from a capture device or an application. Information identifying the barcode may also be provided to data processing system 102. In alternative embodiments, data processing system 102 may automatically generate the barcode.

Data processing system 102 may also receive or determine information identifying a list of permissible colors (step 204). The colors included in list of permissible colors may depend upon the barcode type received in 202 and the target reader device to be used for reading the barcode. The list of permissible colors may comprise one or more colors. The list of permissible colors may be a 1-dimensional list or a multi-dimensional array where each dimension is associated with a part of the barcode (e.g., permissible colors for background and permissible colors for foreground). If the barcode to be positioned in the electronic document is a multi-colored multi-dimensional barcode, the list of permissible colors may comprise of color arrays. In one embodiment, information identifying the list of permissible colors may be provided to data processing system 102. In other embodiments, data processing system 102 may be configured to determine the list of permissible colors. For example, information identifying the barcode type and the target reader to be used for scanning the barcode may be provided to data processing system 102 and based upon that information data processing system 102 may be configured to automatically determine the list of permissible colors.

Other criteria that may be used for determining the area within the electronic document for positioning the barcode and colors for the barcode may also be provided. For example, the size of the barcode to be positioned in the electronic document may be provided (step 206).

Information identifying constraints on the location of the barcode within the electronic document may be received (step 208). For example, a user may identify a specific portion of the electronic document where the barcode is to be positioned. For example, the user may identify a specific page of the electronic document where the barcode is to be positioned, a section of a page, etc. A user may also provide information specifying contents of the electronic document with which the barcode is to be associated. The contents may include for example, an image or any other object within the electronic document, a piece of text within the electronic document, a paragraph within the electronic document, etc. In absence of any location constraining information, the entire electronic document may be considered for positioning the barcode (this may be the default mode).

Data processing system 102 may also receive other information that may be used by data processing system 102 to determine the area within the electronic document and set of colors for the barcode (step 210). The other information received in 210 may comprise information identifying properties of a printer device for printing the electronic document and the barcode, print resolution, paper quality, information identifying the target reader to be used for reading the barcode, etc. Steps 206, 208, and 210 are not required by the present invention and may not be performed in some embodiments of the present invention.

Data processing system 102 then determines an area within the electronic document for positioning the barcode (step 212). The area may be determined based upon information received in 202, 206, 208, and 210. Several different techniques may be used for determining the spatial area within the electronic document for positioning the barcode.

According to one technique, a portion of the electronic document is selected and analyzed to determine features of the portion. The portion that is selected to be analyzed is influenced by location constraining information, if any, that is provided. For example, if data processing system 102 has received information identifying a specific portion of the electronic document where the barcode is to be placed, then the specified portion of the electronic document is selected and analyzed. If the user has identified an object (e.g., an image) within the electronic document with which the barcode is to be associated, then the portion that is selected may comprise the specified object and sections of the electronic document surrounding or proximal to the specified object. If no constraints have been placed on where the barcode can be positioned within the electronic document, then the entire electronic document may be selected and analyzed (i.e., the selected portion is the entire electronic document).

As indicated above, the selected portion of the electronic document is analyzed to determine one or more features of the selected portion. The features may include distribution of the contents (e.g., distribution of text and images) within the electronic document, the colors used in the electronic document, attributes of the contents of the electronic document, and other features of the electronic document (or of the selected portion). Based upon the analysis and one or more features, an area "A" of the electronic document is determined having a determined size and located at a specific location (location coordinates L=(x,y)) within the electronic document for positioning the barcode.

In one embodiment, the selected portion is analyzed to find an area that has the lowest variance. The area with the lowest variance is then designated as the area (area "A") for positioning the barcode. The area with the lowest variance is chosen because there would be less information to obstruct when the barcode is positioned in the area. In another embodiment, an information content value may be assigned for each pixel within the selected portion of the electronic document that is analyzed such that the information content value of an area with text is higher than the information content value of an area with texture. Then the area with the lowest information content value may be designated as the area (i.e., area "A") for positioning the barcode. In other embodiments, the areas within the selected portion of the electronic document may also be prioritized such that their likelihood for selection is higher over that of other regions. For example, if the barcode is to be associated with an image within the electronic document, then areas or regions surrounding the image may be selected for analysis. The areas below the image may be prioritized over other regions to increase their chances of selection for positioning the barcode. Various other techniques and combinations of the techniques may also be used in alternative embodiments.

The size of the area (area "A") determined for positioning the barcode depends upon the type of barcode and on the size, if any, specified for the barcode. For example, a rectangular area "A" may be determined for a rectangular barcode and the width and height of the rectangle may depend on the size, if any, specified for positioning the barcode. The shape of area "A" may vary depending on the type of barcode. If no size for positioning the barcode has been specified, the data processing system 102 may automatically determine the size of the area for positioning the barcode (which in turn determines the size of the barcode positioned in the electronic document). In one embodiment, the size of the determined area "A" may correspond to the size of the barcode received in 202. In other embodiments, the area "A" determined for positioning the barcode may be smaller than the size of the barcode received in 202 and the barcode may be shrunk to fit the smaller area A. In other embodiments, the area "A" determined for positioning the barcode may be larger than the size of the barcode received in 202 and the barcode may be expanded to fit the larger region. Other factors that may be considered in determining the size of area A for positioning the barcode include the print resolution, the type of barcode, the target barcode reader, and the like. According to an embodiment of the present invention, the smallest size possible may be used for positioning the barcode. The size of area "A" is determined such that the barcode when positioned in area "A" is inconspicuous and blends in with the contents of the electronic document but is also clearly visible for error-free reading by a barcode reader.

Referring back to FIG. 2, after an area within the electronic document has been determined for placing the barcode, data processing system 120 then determines a set of one or more colors to be used for the barcode (step 214). The colors to be used for the barcode are selected from the list of permissible colors received or determined in 204. The colors selections are restricted to colors from the permissible list of colors as other colors may cause an error in the scanning and decoding of the barcodes. As previously indicated, the list of permissible colors may depend upon factors such as the barcode type, the target barcode reader, the print resolution, the paper quality, printer properties, etc. Details related to techniques for determining a set of colors to be used for the barcode are provided below with respect to FIG. 3. The set of colors determined in 214 may include one or more colors depending upon the number of colors that are allowed or needed for the barcode.

Data processing system 102 may then output or communicate information identifying the area within the electronic document determined in 212 for positioning the barcode and the set of one or more colors determined in 214 for the barcode (step 216). The output information may include the location of the area within the electronic document and the size of the area. The information may be communicated to another device or system that is configured to perform further processing using the information. Processing may end after step 216.

In some embodiments, data processing system 102 may also create an electronic document comprising the original electronic document received in 202 and the barcode positioned in the area determined in 212 and generated using the set of colors determined in 214 (step 218). The electronic document comprising the barcode may be output using an output device such as a monitor or display.

The electronic document with the barcode may also be printed on a paper medium to generate a paper document comprising the original electronic document and the barcode printed in the area determined in 212 using the set of colors determined in 214 (step 220). The printed paper document may be used for various applications.

FIG. 2 describes a method for determining an area within an electronic document and colors for a single barcode. It should be apparent that the teachings of the present invention may also be used for positioning or placing multiple barcodes within an electronic document (or in multiple electronic documents). For each barcode, an embodiment of the present invention is configured to determine a spatial area within the electronic document for positioning the barcode and a set of colors to be used for the barcode. The teachings of the present invention may also be applied for determining multiple locations with an electronic document for placing a barcode. Further, the techniques of the present invention may be used to determine one or more colors for different types of barcodes (or images in general) such as barcodes represented by vertical or horizontal bars, multi-dimensional barcodes, infrared barcodes, etc. The shape and size of the images to be placed in the electronic document may also vary.

Figure 3:
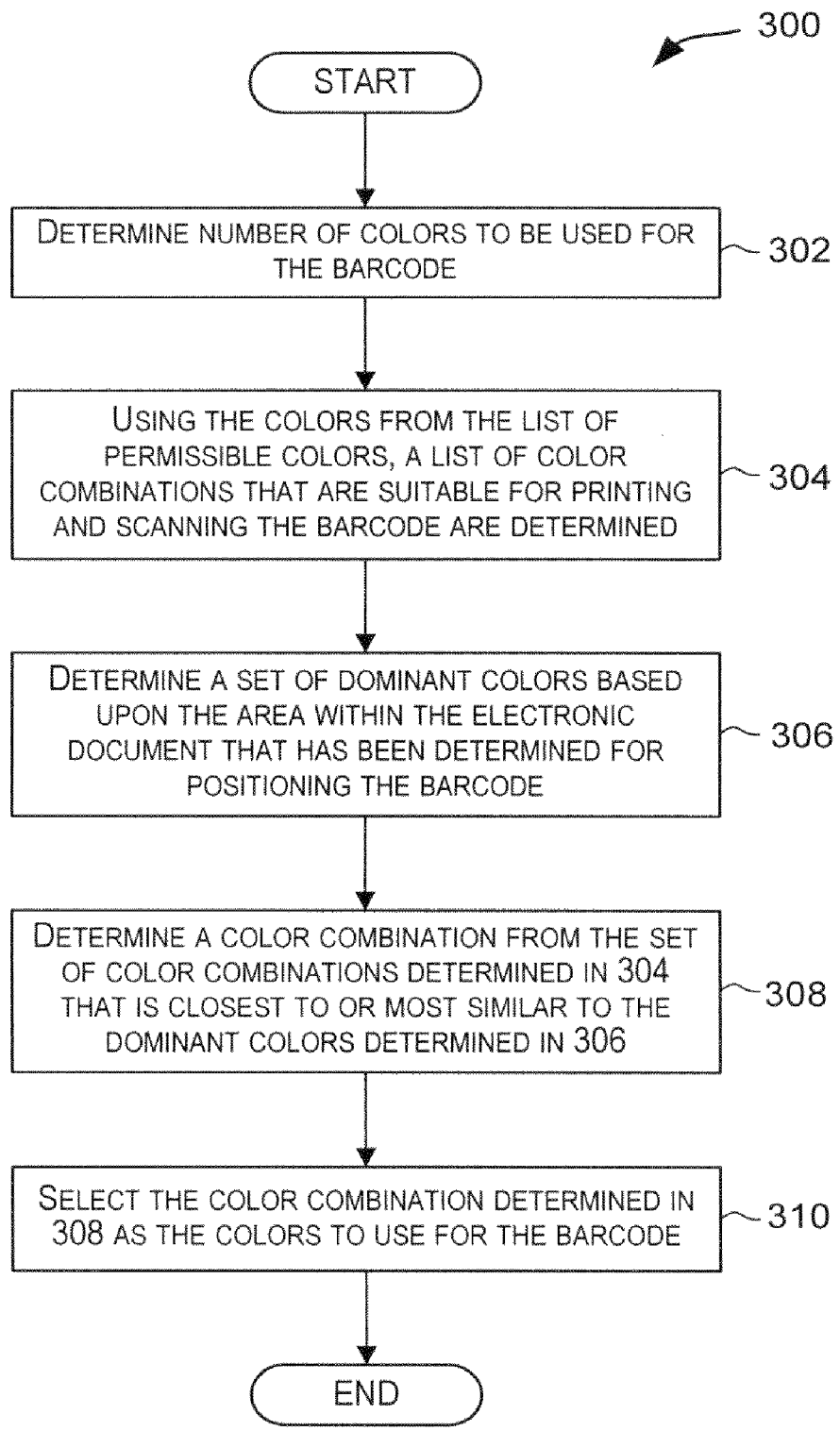
FIG. 3 is a simplified high-level flowchart depicting a method of determining a set of one or more colors for a barcode according to an embodiment of the present invention.

FIG. 3 is a simplified high-level flowchart 300 depicting a method of determining a set of one or more colors for a barcode according to an embodiment of the present invention. The method depicted in FIG. 3 may be performed by software (code modules or instructions) executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, a number of colors to be used for the barcode are determined (step 302). The number of colors may depend upon the type of barcode. For example, if the barcode type allows use of two colors, then the number of colors is determined to be two. In general, if the barcode type allows use of "N" colors, then the number "N" is determined in 302.

Using the colors from the list of permissible colors, a list of color combinations that are suitable for printing and scanning the barcode are determined (step 304). Each combination in the list of combinations may have up to the number of colors determined in 302. For example, if the barcode allows use of two colors, namely a foreground color and a background color, then each combination pair in the list comprises two colors. In this scenario, the list "S" of combinations may be represented as follows:

$$S=\{(B_1,F_1), (B_2,F_2), \ldots, (B_n,F_n)\}$$

where each combination $(B_m,F_m)$ comprises a background color and a foreground color. The color combinations may depend on the reading technology, printing technology, and the barcode technology. For example, for reading Interleaved ⅖ with laser scanners, it is more suitable to have a light background color that is towards the red end of the spectrum and a dark foreground color that is towards the blue end of the spectrum. In general, if the barcode type allows printing with "N" colors corresponding to "N" parts of the barcode, the combination list S is composed of elements that each comprise up to N colors $(C1_m, C2_m, C3_m, \ldots, CN_m)$.

A set of dominant colors is determined based upon the area within the electronic document that has been determined for positioning the barcode (step 306). The number of colors in the set of dominant colors may vary. In one embodiment, if "N" colors can be used for the barcode as determined in step 302, then up to "N" dominant colors may be determined in 306.

Different techniques may be used to determine the set of dominant colors. According to one technique, a region of the electronic document around and including the area where the barcode is to be positioned is analyzed and a color histogram computed for the region. For example, if the barcode is to be positioned in a square area with specific coordinates in the electronic document, then a region encompassing the square area and possibly other area around the square area may be chosen for the analysis. Colors representing the histogram bins with the highest number of pixels are selected as the dominant colors. According to another technique, the color of each pixel in the region of the electronic document to be analyzed is quantized using a large quantization step in a given color space, connected component analysis is performed, regions with the largest number of pixels are determined, and colors of these regions are selected as the dominant colors. Various other techniques and combinations thereof may also be used for determining the dominant colors based upon the area of the electronic document where the barcode is to be positioned.

A color combination from the set of color combinations determined in 304 that is closest to or most similar to the dominant colors determined in 306 is then determined (step 308). Various techniques may be used to determine the closest combination. For example, lets assume that each combination in the set of combinations determined in 304 comprises two colors $(B_m, F_m)$, a background color and a foreground color, and that two dominant colors $(D_1, D_2)$ are determined in 306. Given this, there are several techniques (three of which are described below that may be used to determine the closest combination $(B_m, F_m)$ from the set of combinations.

(1) The differences in the weighted sums of color pairs are minimized.

$$(B_m, F_m) = \min_{(B_i,F_i) \in S} \{d(aB_i + bF_i, cD_1 + dD_2)\}$$

where a, b, c, and d are weighted constants, d is the Euclidian distance.

(2) The sums of distances in the weighted color pairs are minimized.

$$(B_m, F_m) = \min_{(B_i,F_i) \in S} \{d(aB_i + cD_1) + d(bF_i + dD_2)\}$$

where a, b, c, and d are weighted constants, d is the Euclidian distance.

(3) First, determine the barcode background color as the color that is most similar to $$D_1, B_m = \min_{(B_i) \in S} \{d(B_i, D_1)\}.$$

Then, given $B_m$, determine the set of foreground colors available for printing, set $SF=\{F_1, F_2, \ldots, F_K\}$. Lastly, determine the barcode foreground color as the color that is most similar to $$D_2, F_m = \min_{(F_K) \in SF} \{d(F_K, D_2)\}.$$

It should be apparent that various other techniques may also be used. Further, the color combination that is determined in 308 may comprise one or more colors. The one or more colors in the color combination determined in step 308 are then selected or designated as the colors to use for the barcode (step 310).

Figure 4:
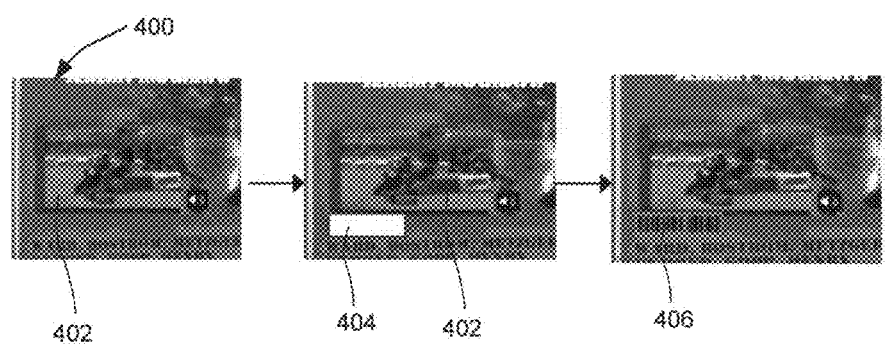
FIG. 4 depicts results of the performing processing according to an embodiment of the present invention.

FIG. 4 depicts results of the performing processing according to an embodiment of the present invention. A colored electronic document is received in which a barcode is to be placed. A portion 400 of the document is depicted in FIG. 4. Information is also received indicating that the barcode is to be associated with image 402 in the electronic document. Processing is then performed to determine an area in the electronic document for placing the barcode. The processing takes into consideration the image 402 and its surrounding area. An area 404 is then determined for positioning the barcode. As depicted in FIG. 4, area 404 is determined such that it is proximal to image 402 with which the barcode is to be associated and at the same time the barcode when positioned in the area would not obstruct text or contents of the electronic document. A set of two colors is then determined for the barcode. The colors are determined by analyzing the region of the electronic document around and including area 404 where the barcode is to be positioned. As can be seen from FIG. 4, the dominant colors in this region are red and black which are also permissible colors for the barcode. Accordingly, a barcode 406 is printed in colors red (background color) and black (foreground color) and positioned in area 402. As is evident from FIG. 4, the colored barcode blends in with the surrounding contents of the electronic document but is still clearly visible for scanning.

Figure 5:
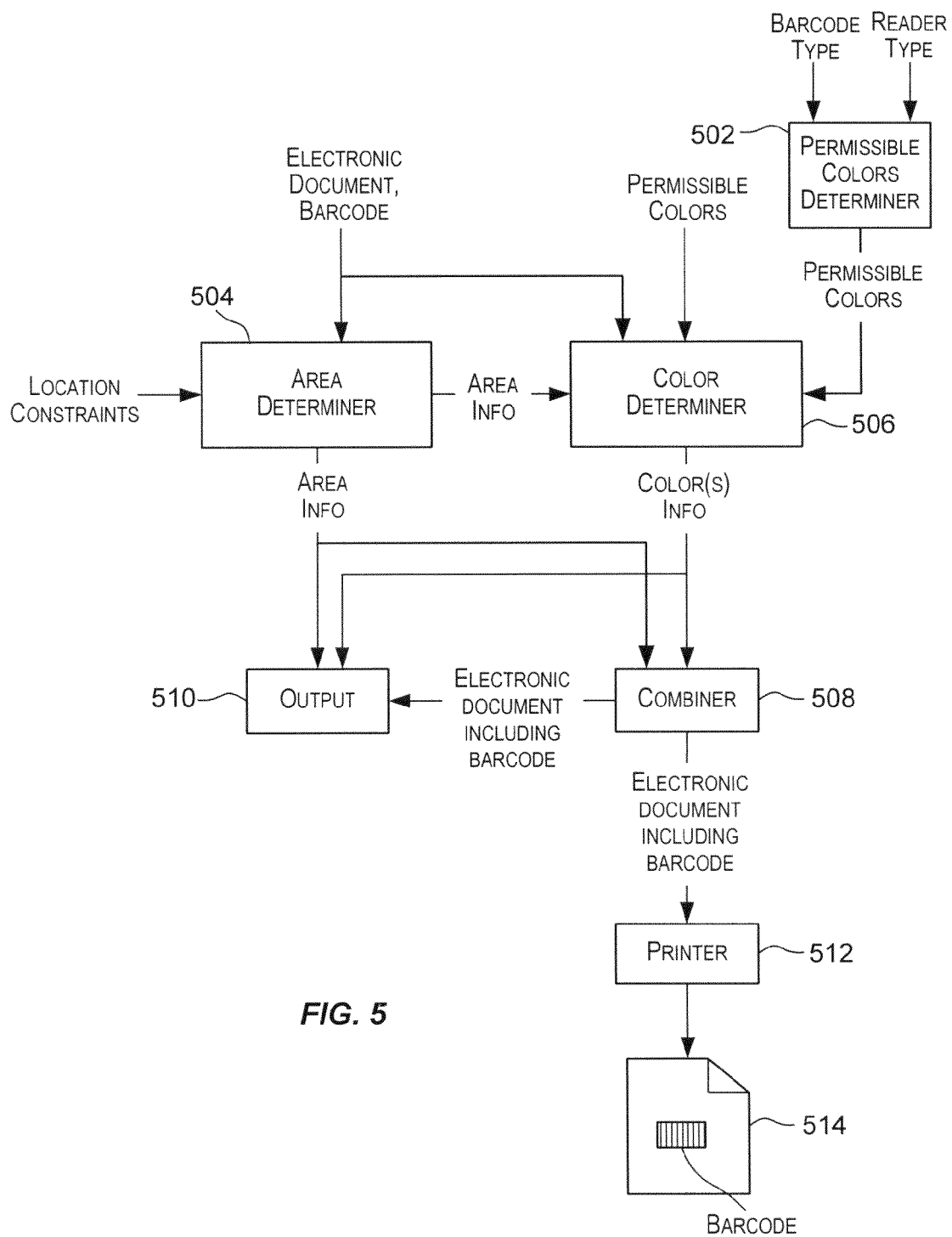
FIG. 5 is a simplified block diagram of modules that may be used to perform processing according to an embodiment of the present invention.

FIG. 5 is a simplified block diagram of modules that may be used to perform processing according to an embodiment of the present invention. The modules depicted in FIG. 5 may be implemented in software (code modules or instructions) or hardware or combinations thereof. Further, the modules depicted in FIG. 5 depict just one embodiment of the present invention and are not intended to limit the scope of the present invention as recited in the claims. As shown in FIG. 5, the modules may include a permissible colors determiner module 502, an area determiner module 504, a color determiner module 506, a combiner module 508, an output module 510, and a printer module 512.

Permissible colors determiner module 502 is configured to determine a list of permissible colors that can be used for the barcodes. Module 502 is configured to use information identifying the barcode type and the reader device to be used for scanning the barcode to determine a list of permissible colors for printing and scanning the barcodes. Information identifying the list of permissible colors may be communicated to color determiner module 506.

Area determiner module 504 is configured to determine an area in the electronic document for placing a barcode. Area determiner module 504 may access the electronic document and the barcode from an accessible memory location or the information may be provided to area determiner module 504. Area determiner module 504 may also receive location constraints information that may impose constraints on where the barcode may be positioned in the electronic document. As described above, this may include information identifying the size of the area to be used for positioning the barcode, a region of the electronic document where the barcode is to be positioned, an object in the electronic document with which the barcode is to be associated, and the like. Upon determining the area of the electronic document where the barcode is to be positioned, information identifying the determined area may be communicated to color determiner module 506, to output module 510, and to combiner module 508.

Color determiner module 506 is configured to determine a set of one or more colors to be used for the barcode. The set of colors are selected from the list of permissible colors. Color determiner module 506 determines the set of colors based upon the area for positioning the barcode determined by area determiner module 504. Information identifying the set of colors to be used for the barcode may be communicated to output module 510 and to combiner module 508.

Combiner module 508 is configured to generate an electronic document that comprises the original electronic document along with the barcode positioned in the area of the electronic document determined by area determiner module 504 and using the colors determined by color determiner module 506. Combiner module 508 may communicate the generated electronic document to out put module 510 and printer module 512.

Printer module 512 is configured to print the electronic document with the barcode on a paper medium to generate a paper document 514. The term "paper" or "paper medium" as used in this application is intended to refer to any tangible medium on which information can be printed, written, drawn, imprinted, embossed, etc. Printing on a paper medium is intended to include printing, writing, drawing, imprinting, embossing, and the like. Paper document 514 is a printed version of the original electronic document with the barcode printed in the area determined by area determiner module 504 and printed using the one or more colors determined by color determiner module 506. The printed paper document 514 may be used for various different applications as described above. For example, the printed barcode may be scanned by a reader such as barcode scanner and the information encoded by the barcode may be decoded by the reader. The decoded information may then be used to initiate a variety of different applications such as access to electronic information such as web pages, multimedia information, electronic representation of the paper document, and the like.

Output module 510 is configured to output information to a user. The information that is output may comprise information identifying the area of the electronic document determined by area determiner module 504 for positioning the barcode. This information may include the size of the area and the location of the area within the electronic document. The output information may also include information identifying the one or more colors to be used for the barcode that are determined by color determiner module 506. Output module 510 may also output the electronic document with the barcode positioned in it.

Figure 6A:
FIG. 6A depicts a paper document comprising a barcode that has been printed according to an embodiment of the present invention.

FIG. 6A depicts a paper document 600 comprising a barcode that has been printed according to an embodiment of the present invention. Paper document 600 depicted in FIG. 6A is a page from a magazine. A colored barcode 602 is printed on page 600 according to the teachings of the present invention. Colored barcode 602 is associated with image 604 printed on page 600. The location of barcode 602 and the colors used for printing barcode 602 are such that barcode 602 visually blends in with the other contents of page 600. This increases the aesthetic value of the printed material on page 600. Barcode 602 may be scanned using a barcode scanner to initiate some application. As depicted in FIG. 6A, scanning barcode invokes a multimedia player 606 to play a video clip corresponding to the magazine article. The video clip may be output on a computer system such as a portable device, a laptop, a cell phone, a kiosk, a television, and the like. Barcode 602 thus not only preserves the visual aesthetics of page 600 but also provides a quick link for accessing electronic information corresponding to the magazine article.

Figure 6B:
FIG. 6B depicts a portion of a web page comprising barcodes printed according to the teachings of the present invention.

FIG. 6B depicts a portion of a web page 650 comprising barcodes printed according to the teachings of the present invention. Web page 650 comprises several barcodes positioned in different areas of web page 650 and using different color combinations. The locations of the barcodes and the colors used for printing the barcodes are such that the barcodes visually blend in with the other contents of web page 650. This increases the aesthetic value of web page 650. Web page 650 along with the barcodes may be printed on paper. The barcodes on the resultant paper document may be scanned using a barcode scanner to initiate applications 652 corresponding to the barcodes. For example, scanning a barcode may invoke an application that provides access to electronic information corresponding to the barcode. Each barcode on web page 650 may have different electronic information associated with it. The barcodes thus provide a quick link for accessing electronic information while maintaining the visual aesthetics of web page 650.

Figure 7:
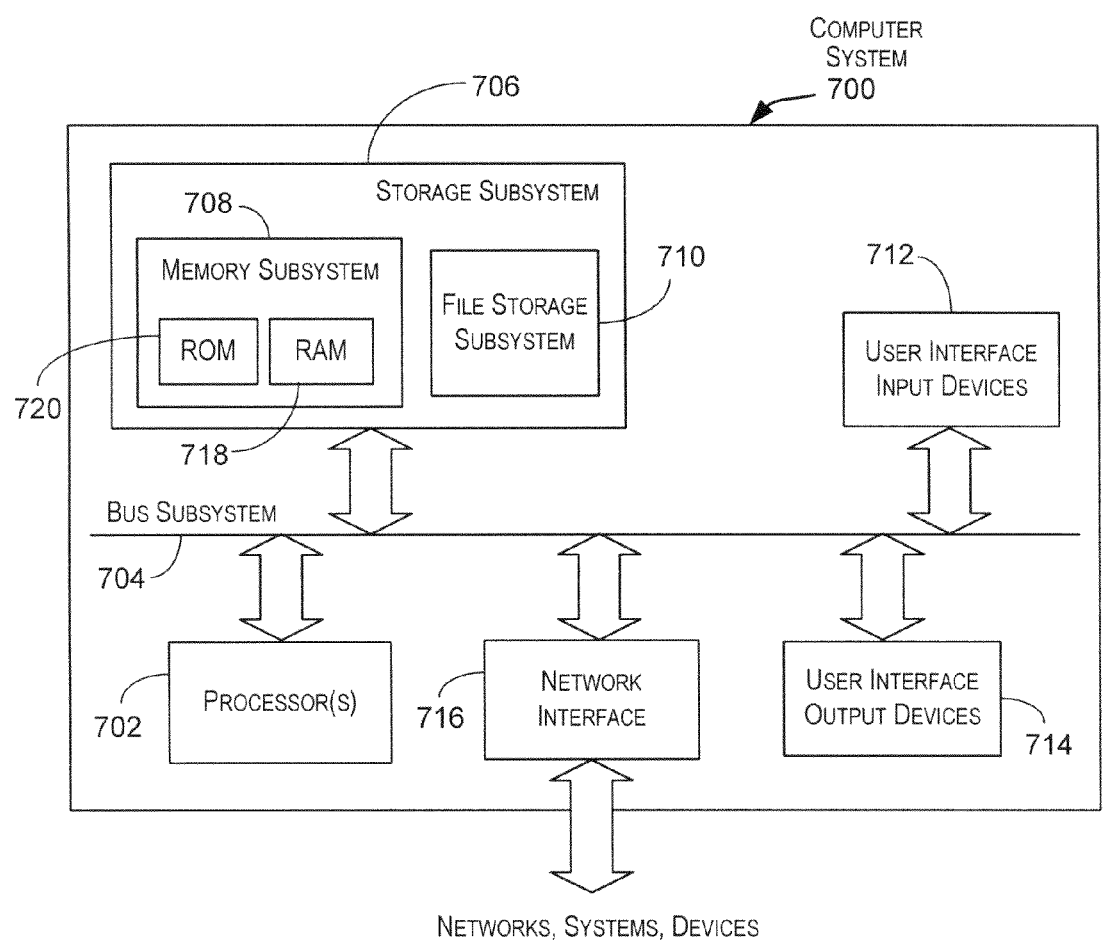
FIG. 7 is a simplified block diagram of a computer system that may be used to practice an embodiment of the present invention.

FIG. 7 is a simplified block diagram of a computer system 700 that may be used to practice an embodiment of the present invention. As shown in FIG. 7, computer system 700 includes a processor 702 that communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, networks, and devices. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 may be configured to store the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer system of positioning an image in an electronic document, the method comprising:
    determining, by the computer system, a plurality of colors based upon a type of the image and information concerning a reader device to be used for reading the image;
    receiving, by the computer system, information specifying a constraint on where the image is to be positioned within the electronic document, the received information identifying a content region of the electronic document with which the image is to be associated;
    determining, by the computer system, a first area within the electronic document for positioning the image; and
    determining, by the computer system, based upon the first area, a set of one or more colors from the plurality of colors for generating the image, wherein the set of colors comprises one or more colors selected from the plurality of colors that are closest to one or more colors of a region of the electronic document comprising the first area and area surrounding the first area;
    wherein determining the first area comprises:
        determining a portion of the electronic document based upon the constraint, the determined portion of the electronic document comprising the content region and a region proximal to the content region;

analyzing the portion to determine a feature of the portion; and determining the first area based upon the feature of the portion.

2. The method of claim 1 wherein the image is a barcode.

3. The method of claim 1 further comprising:

generating the image using the set of one or more colors, the image being readable by the reader device such that the information encoded by the image is decodable; and positioning the image in the electronic document in the first area.

4. The method of claim 1 further comprising printing the electronic document and the image on a paper medium to generate a paper document such that the image is printed in the first area of the electronic document using the set of one or more colors.

5. The method of claim 1 wherein analyzing the portion to determine a feature of the portion comprises determining an area of low variance in the portion.

6. The method of claim 1 wherein determining the set of one or more colors comprises:

analyzing the region of the electronic document comprising the first area and area surrounding the first area; and determining the set of one or more colors based upon analysis of the region.

7. The method of claim 1 wherein determining the set of one or more colors comprises:

determining a set of one or more color combinations suitable for the image, each color combination comprising two or more colors from the plurality of colors;

determining a set of one or more dominant colors for the region of the electronic document comprising the first area and area surrounding the first area;

determining a first color combination from the set of one or more color combinations that is closest to the set of dominant colors; and selecting the one or more colors in the first color combination as the set of one or more colors for generating the image.

8. A non-transitory computer-readable storage medium storing a plurality of instructions for controlling a data processor to position an image in an electronic document, the plurality of instructions comprising:

instructions that cause the data processor to determine a plurality of colors based upon a type of the image and information concerning a reader device to be used for reading the image;

instructions that cause the data processor to receive information specifying a constraint on where the image is to be positioned within the electronic document, the received information identifying a content region of the electronic document with which the image is to be associated;

instructions that cause the data processor to determine a first area within the electronic document for positioning the image; and instructions that cause the data processor to determine, based upon the first area, a set of one or more colors from the plurality of colors for generating the image, wherein the set of colors comprises one or more colors selected from the plurality of colors that are closest to one or more colors of a region of the electronic document comprising the first areas;

wherein the instructions that cause the data processor to determine the first area comprise:

instructions that cause the data processor to determine a portion of the electronic document based upon the constraint, the determined portion of the electronic document comprising the content region and a region proximal to the content region;

instructions that cause the data processor to analyze the portion to determine a feature of the portion; and instructions that cause the data processor to determine the first area based upon the feature of the portion.

9. The computer-readable storage medium of claim 8 wherein the plurality of instructions further comprise:

instructions that cause the data processor to generate the image using the set of one or more colors, the image being readable by the reader device such that the information encoded by the image is decodable; and instructions that cause the data processor to position the image in the electronic document in the first area.

10. The computer-readable storage medium of claim 8 wherein the plurality of instructions further comprise instructions that cause the data processor to print the electronic document and the image on a paper medium to generate a paper document such that the image is printed in the first area of the electronic document using the set of one or more colors.

11. The computer-readable storage medium of claim 8 wherein the instructions that cause the data processor to determine the set of one or more colors comprise:

instructions that cause the data processor to analyze the region of the electronic document comprising the first area and area surrounding the first area; and instructions that cause the data processor to determine the set of one or more colors based upon analysis of the region.

12. The computer-readable storage medium of claim 8 wherein the instructions that cause the data processor to determine the set of one or more colors comprise:

instructions that cause the data processor to determine a set of one or more color combinations suitable for the image, each color combination comprising two or more colors from the plurality of colors;

instructions that cause the data processor to determine a set of one or more dominant colors for the region of the electronic document comprising the first area and area surrounding the first area;

instructions that cause the data processor to determine a first color combination from the set of one or more color combinations that is closest to the set of dominant colors; and instructions that cause the data processor to select the one or more colors in the first color combination as the set of one or more colors for generating the image.

13. A system for positioning an image in an electronic document, the system comprising:

a processor; and a memory coupled to the processor, the memory configured to store the electronic document;

wherein the processor is configured to:

determine a plurality of colors based upon a type of the image and information concerning a reader device to be used for reading the image;

receive information specifying a constraint on where the image is to be positioned within the electronic document, the received information identifying a content region of the electronic document with which the image is to be associated;

determine a first area within the electronic document for positioning the image by:

determining a portion of the electronic document based upon the constraint, the determined portion of the electronic document comprising the content region and a region proximal to the content region, analyzing the portion to determine a feature of the portion, and determining the first area based upon the feature of the portion; and determine, based upon the first area, a set of one or more colors from the plurality of colors for generating the image, wherein the set of colors comprises one or more colors selected from the plurality of colors that are closest to one or more colors of a region of the electronic document comprising the first area.

14. The system of claim 13 wherein the processor is configured to:

generate the image using the set of one or more colors, the image being readable by a reader device such that information encoded by the image is decodable; and position the image in the electronic document in the first area.

15. The system of claim 13 wherein the processor is configured to determine the set of one or more colors by:

analyzing the region of the electronic document comprising the first area and area surrounding the first area; and determining the set of one or more colors based upon analysis of the region.

16. The system of claim 13 wherein the processor is configured to determine the set of one or more colors by:

determining a set of one or more color combinations suitable for the image, each color combination comprising two or more colors from the plurality of colors;

determining a set of one or more dominant colors for the region of the electronic document comprising the first area and area surrounding the first area;

determining a first color combination from the set of one or more color combinations that is closest to the set of dominant colors; and selecting the one or more colors in the first color combination as the set of one or more colors for generating the image.

* * * * *